United States Patent
Wilson

(10) Patent No.: US 7,248,689 B2
(45) Date of Patent: Jul. 24, 2007

(54) DISPLAY DEVICE

(75) Inventor: Richard C Wilson, Woodbridge (GB)

(73) Assignee: British Telecommunications, public limited company, London (GB)

( * ) Notice: Subject to any disclaimer, the term of this patent is extended or adjusted under 35 U.S.C. 154(b) by 501 days.

(21) Appl. No.: 10/466,282

(22) PCT Filed: Feb. 4, 2002

(86) PCT No.: PCT/GB02/00475

§ 371 (c)(1),
(2), (4) Date: Jul. 15, 2003

(87) PCT Pub. No.: WO02/063864

PCT Pub. Date: Aug. 15, 2002

(65) Prior Publication Data

US 2004/0059713 A1    Mar. 25, 2004

(30) Foreign Application Priority Data

Feb. 20, 2001 (EP) .................................. 01300956

(51) Int. Cl.
*H04M 3/00* (2006.01)
*H04M 11/00* (2006.01)
*H04M 15/00* (2006.01)

(52) U.S. Cl. ................ 379/354; 379/88.11; 379/114.13
(58) Field of Classification Search ............. 379/88.11, 379/88.22, 111, 114.13, 354, 93.17, 93.12
See application file for complete search history.

(56) References Cited

U.S. PATENT DOCUMENTS

| 4,850,007 A | 7/1989 | Marino et al. |
| 5,757,803 A | 5/1998 | Russell et al. |
| 5,812,647 A | 9/1998 | Beaumont et al. |
| 5,873,068 A | 2/1999 | Beaumont et al. |

FOREIGN PATENT DOCUMENTS

| EP | 0344672 | 12/1989 |
| EP | 0658035 A2 | 6/1995 |
| EP | 0344672 A1 | 12/1998 |

OTHER PUBLICATIONS

European Office Action dated May 11, 2006.
Canadian Office Action dated Jul. 31, 2006.

*Primary Examiner*—Curt Kuntz
*Assistant Examiner*—Tuan Duc Nguyen
(74) *Attorney, Agent, or Firm*—Nixon & Vanderhye P.C.

(57) ABSTRACT

This invention provides a display device that can be updated via a communications network. In an improved version the advertising material used to update the device depends upon a called number dialled on a telephone which is associated with the device.

10 Claims, 3 Drawing Sheets

DISPLAY DEVICE

This application is the US national phase of international application PCT/GB02/00475 filed 4 Feb. 2002 which designated the U.S.

This invention relates to an display device which may be automatically updated using a signal sent via a telephone line.

The use of LCD or similar flat panel display panels in an advertising device is known. Such advertising devices show a series of advertisements that are stored in a memory associated with the advertising device. The advertisements are shown usually in a repeating sequence of several advertisements depending upon the amount of memory available in the advertising device, and upon the number of advertisements that have been pre-stored in that device. Periodically the memory in the advertising device is updated so that new advertisements may be shown. This process generally involves somebody visiting the site of the advertising device so that the process of updating the advertising material is expensive and time consuming.

According to the present invention there is provided an advertising device comprising: a modem; a processor connected to receive a signal from the modem; and an advertising panel connected to receive a signal from the processor; in which the modem is arranged to demodulate an advertising signal encoding advertising material received via an incoming telephone line and to send a demodulated signal to the processor; and in which the processor is arranged to use the demodulated signal to send a signal to the advertising panel to cause said advertising material to be displayed on the advertising panel.

Advantageously the advertising device further comprises a telephone connected to the telephone line via a terminator having a filter in which the filter is arranged to attenuate the advertising signal so that said telephone may operate independently of the advertising signal.

The advertising device may also comprise an interface device connected to receive a dialled number and to decode said number; and in which the processor is arranged to send the decoded number to the remote updating device so that advertisements relevant to the called number may be sent to the advertising device via the telephone line.

Preferably the advertising device also comprises a remote updating device having access to a customer database; a business customer database; and an advertising material database; the remote updating device being arranged to receive a number from a telephone associated with an advertising device; access said databases to determine advertising material associated with the received number; and transmit said advertising material to the advertising device.

According to another aspect of the invention there is provided a remote updating device having access to a customer database; a business customer database; and an advertising material database; the device being arranged to receive a number from a telephone associated with an advertising device; access said databases to determine advertising material associated with the received number; and transmit said advertising material to the advertising device.

According to another aspect of the invention there is provided a method of updating an advertising panel associated with a telephone such that the advertising panel is updated via a communications network the method comprising the steps of: accessing a customer database to identify a called party using a number dialled by a user of the telephone; retrieving details from a business customer database of a business related to the called party; retrieving an advertisement associated with said business; and sending said advertisement to the advertising panel via the communications network.

An embodiment of the invention will now be described by way of example only with reference to the accompanying drawings in which.

Figure 1:
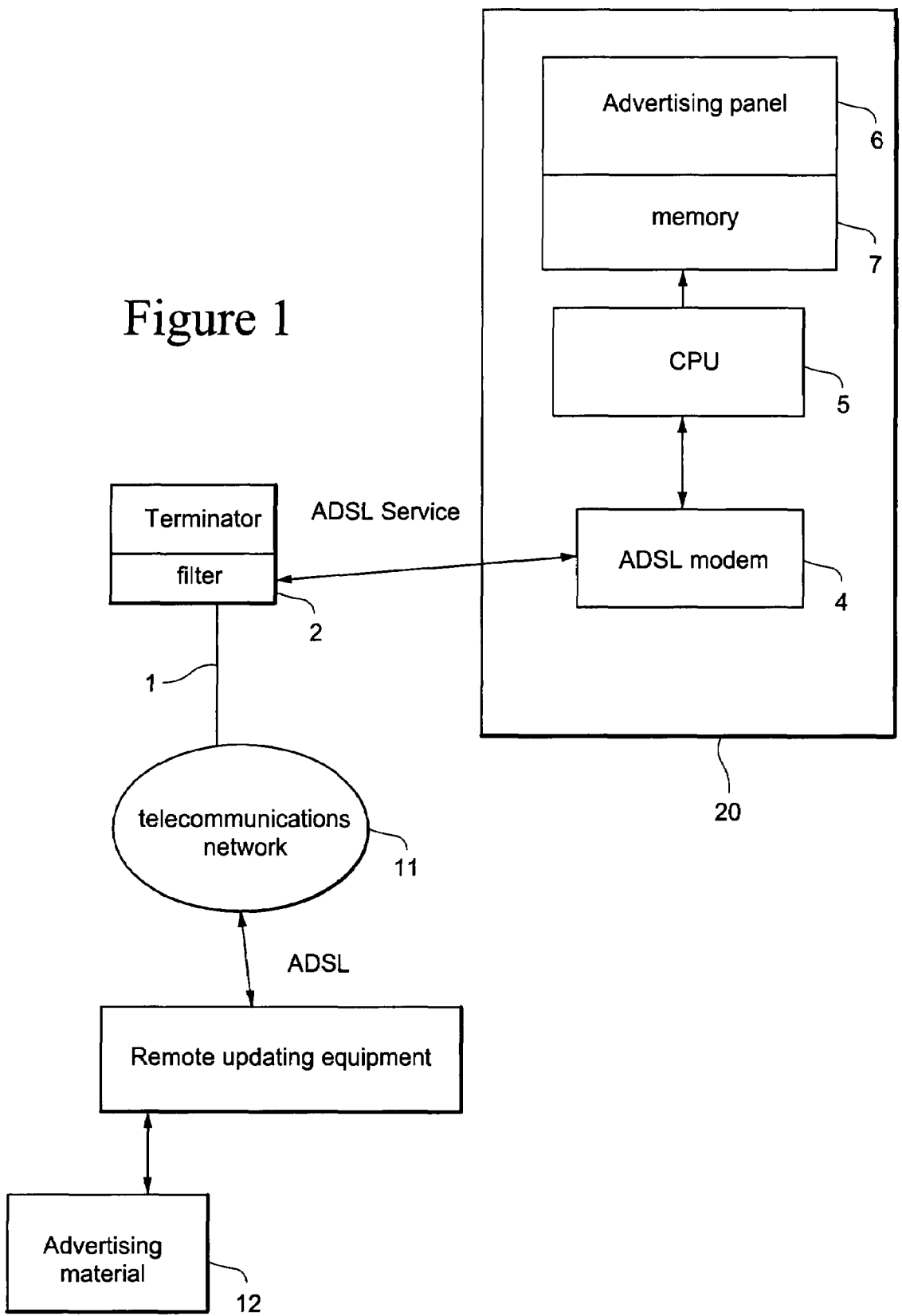
FIG. 1 illustrates an advertising device which is capable of being updated remotely via a telecommunications network.

FIG. 1 illustrates an advertising device 20 which is connected to a remote updating device 3 via a telecommunications network 11. An incoming telephone line 1 is connected to network termination equipment 2 which has an Asymmetric Digital Subscriber Line (ADSL) filter 21. An ADSL signal from the remote updating device 3 is filtered from any other signal on the incoming line by the ADSL filter 21 and sent to an ADSL modem 4 where the signal is demodulated and sent to a processor 5. The processor interprets the demodulated ADSL signal and provides as an output a signal suitable for updating an advertising panel 6 which has associated memory 7. The remote updating device 3 accesses advertising material stored in a database 12, and new advertising material is sent to the advertising device via the telecommunications network 11 at regular intervals.

Figure 2:
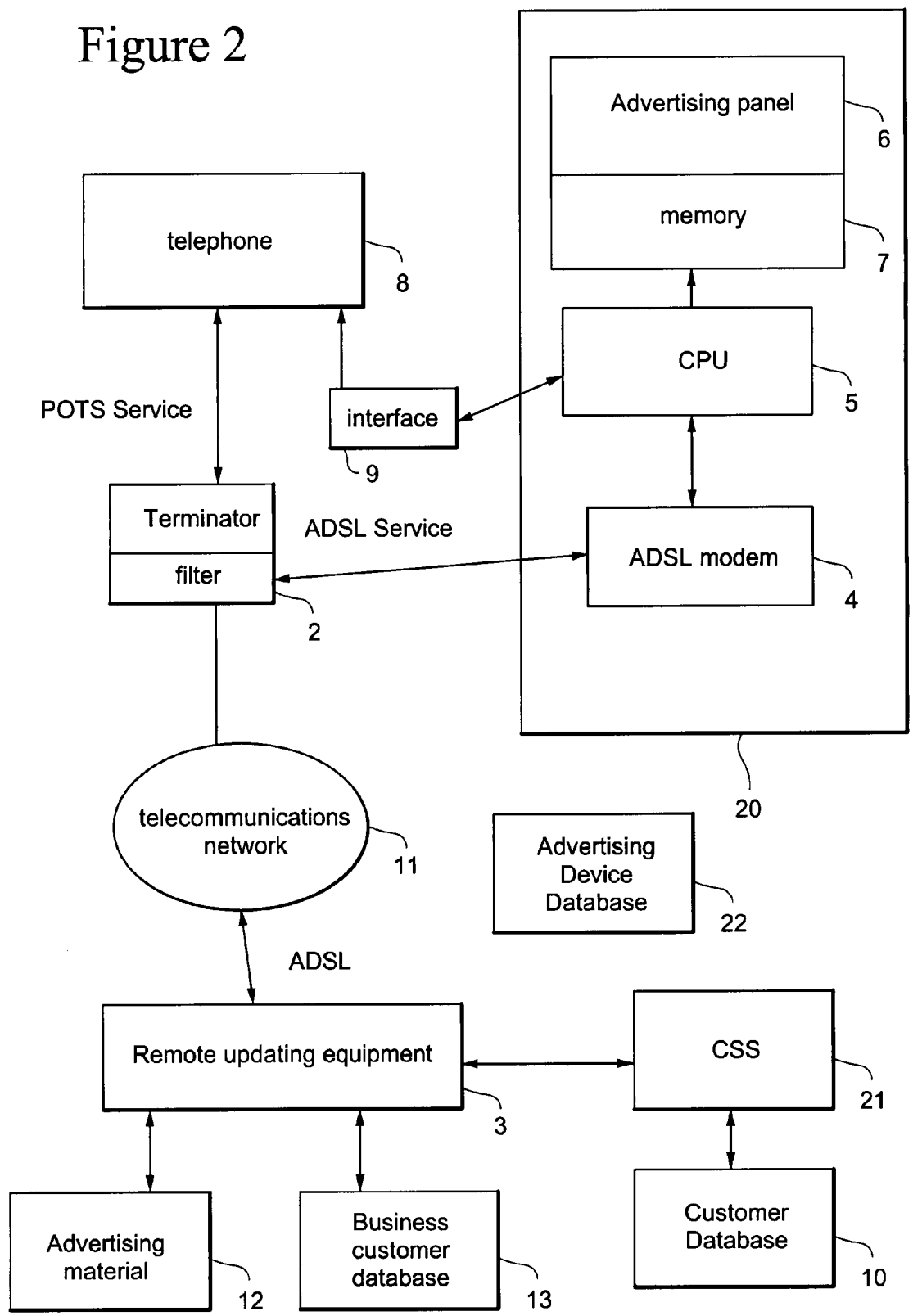
FIG. 2 illustrates an advertising device which also include a telephone and in which the number dialled is used to select relevant advertising material to be displayed on the advertising device.

The signal could be sent via telecommunications network 11 using other transmission protocols for example VDSL, ISDN for example. FIG. 2 illustrates an improved device which also includes a telephone 8 having a telephone keypad interface 9. A user dials a telephone number and this number is decoded using the telephone keypad interface. This number is sent to the processor 5 which then sends this information via the ADSL modem 4 to the remote updating device 3 via the filter 2 and telecommunications network 11. The remote updating device 3 uses the received information to access a Customer Service System (CSS) 21 and the customer called is determined by using the number dialled and using the CSS to look up the appropriate data in a database 10 maintained by the CSS 9. Once the called customer has been identified this information is returned to the remote updating device 3. If the called customer is a business customer then a database 13, which contains details of business customers, is consulted by the remote updating device 3 in order to identify similar businesses. If these identified businesses have advertising material available in the database 12 then this advertising material is used to update the advertising device 20 via the telecommunications network 11. The remote updating device has a database 22 in which data is stored showing which advertising devices are associated with which telephones, so that the advertising material may be sent to the advertising device which is associated with the telephone from which the call was made. The association may be that the advertising device 20 and the telephone 8 are co-located. For example the telephone 8 may be a particular payphone, and the advertising device 20 may be an advertising device which is beside said payphone.

In other embodiments of the invention the advertising panel may be incorporated into the housing of the telephone, and the components of the advertising device may be housed within the telephone housing. The associated telephone could be a payphone, in which case extra circuitry will be required in the interface device to deal with metering signals. In further embodiments of the invention, the associated telephone may be a mobile telephone using GSM, GRPS or a third generation technology such as UMTS all of which may be equipped to receive and display advertising or other data. A further alternative may be a PDA, computer or similar device arranged to make telephone calls and to receive associated data as described in the embodiments herein.

Figure 3:
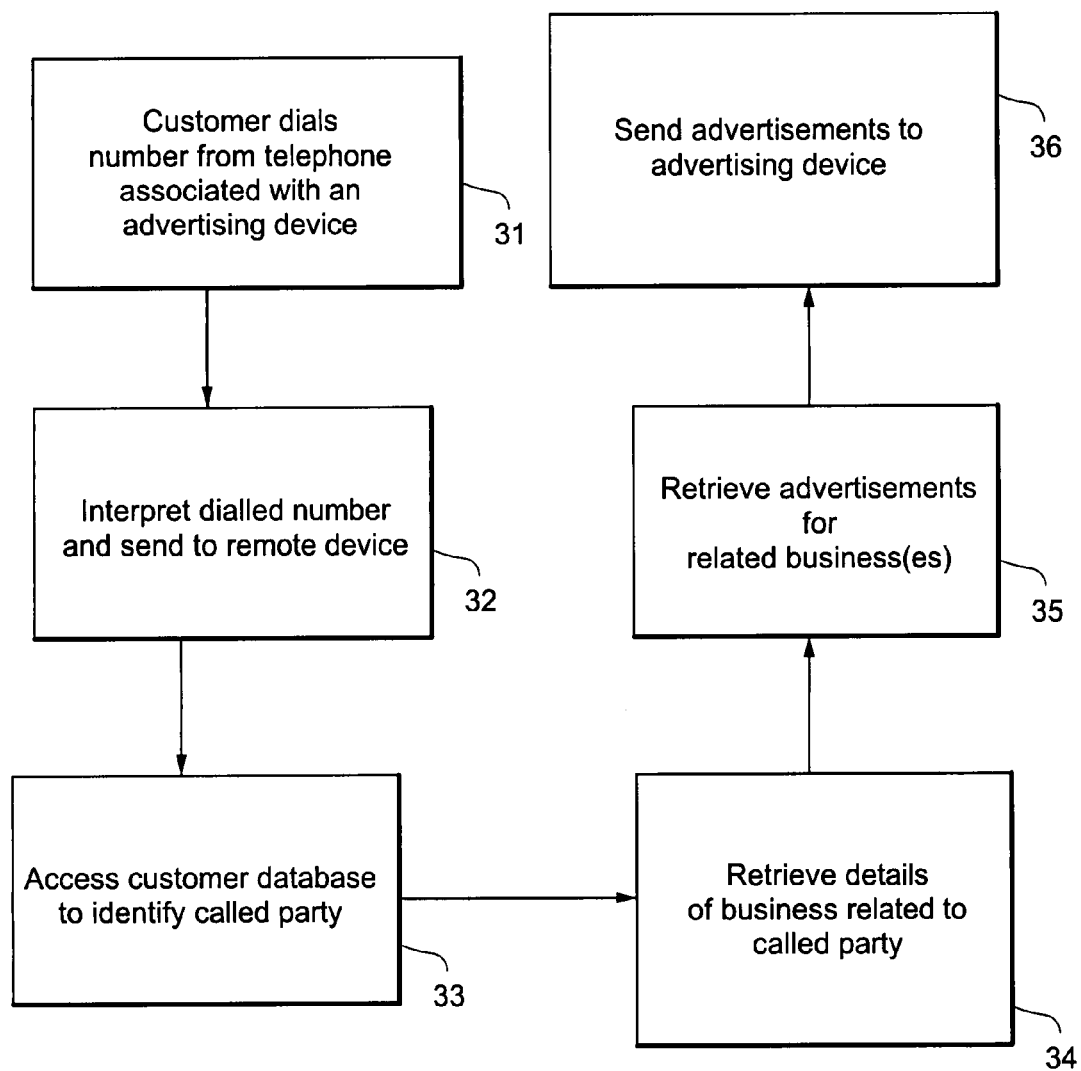
FIG. 3 is a flow chart showing the method of selecting relevant advertising material for display on an advertising device.

A method of updating an advertising device via a communications network will now be described with reference to FIG. 3 and also to FIG. 2. At step 31 a customer dials a number using a telephone 8 which is associated with an advertising device 20. At step 32 the dialled number is interpreted by a keypad interface device 9 and sent to a remote device 3 via the communications network 11. At step 33 the remote device 3 accesses a customer database 10 via CSS 21 to find out the identity of the called customer. Then at step 34 the remote device 3 uses this information to access a business customer database 13 to retrieve details of businesses related to the business of the called customer. Once these related businesses have been identified, then at step 35 an advertising material database 12 is consulted to retrieve any advertising material for these related businesses. This advertising material is then sent via the communications network 11 to the advertising device 20 associated with the telephone 8 from which the customer is calling. The associated advertising device 20 is determined using a database 22 which shows which advertising devices are associated with which calling line identities (CLI).

In other embodiments of the invention other algorithms for identifying suitable advertising material relevant to the called number may be used, for example if the user is calling a theatre or cinema, for example, advertisements for nearby restaurants or public houses may be displayed. If the user is calling a restaurant, for example, advertisements relating to nearby taxi firms may be displayed.

It is also possible for the remote updating device to use information relating to the location of the telephone, using the number of the telephone, in order to select advertising material to send to an associated advertising device.

It is also possible to include a touch screen, so that the user could request that a selected advertiser rings them back using the number of the telephone co-located with the touch screen. A signal would be sent to the remote updating device and the remote updating device would send such a request to the selected advertiser, after consulting the database 13 to determine the required details for that advertiser.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A data display system comprising:
    a modem;
    a processor connected to receive a signal from the modem; and
    an interface device which is connected to receive a dialed number and in which the processor is arranged to send the dialed number to a remote updating device so that display data relevant to the dialed number may be sent to the data display system via the telephone line
    a display panel connected to receive a signal from the processor; in which the modem is arranged to demodulate a display data signal encoding display material received via an incoming telephone line and to send a demodulated signal to the processor; and in which the processor is arranged to use the demodulated signal to send a signal to the display panel to cause said display material to be displayed on the display panel.

2. A data display system according to claim 1 further comprising a telephone connected to the telephone line via a terminator having a filter in which the filter is arranged to attenuate the display data signal so that said telephone may operate independently of the display data signal.

3. A data display system according to claim 2 wherein the interface device is further arranged to decode said number; and in which the processor is arranged to send the decoded number to the remote updating device so that display data relevant to the dialed number may be sent to the display device via the telephone line.

4. A data display system according to claim 3 wherein the remote updating device has access to:
    a customer database;
    a business customer database; and
    a display data database;
the remote updating device being arranged to
    receive a number from a telephone associated with data display system;
    access said databases to determine display data associated with the received number; and
    transmit said display data to the display device.

5. A remote updating device having access to
    a customer database;
    a business customer database; and
    a display data database;
characterized in that the device is arranged to
    receive a dialed number from a telephone associated with an advertising device; access said databases to determine display data associated with the received dialled number; and
    transmit said display data to the advertising device.

6. A method of updating a display associated with a telephone such that the display is updated via a communications network the method comprising the steps of:
    accessing a customer database to identify a called party using a number dialled by a user of the telephone;
    retrieving details from a business customer database of a business related to the called party;
    retrieving data such as an advertisement associated with said business; and
    sending said advertisement to the display via the communications network.

7. A communications device comprising:
    means for making a telephone call to one or more telephone numbers associated with a set of data such as advertising data;
    means operable to receive a set of data associated with a called number; and
    the data display system according to claim 1.

8. A communications device comprising: means for making a telephone call to one or more telephone numbers associated with a set of data such as advertising data; means operable to receive a set of data associated with a called number; and the data display system according to claim 2.

9. A communications device comprising:
    means for making a telephone call to one or more telephone numbers associated with a set of data such as advertising data; means operable to receive a set of data associated with a called number; and the data display system according to claim 3.

10. A communications device comprising:

means for making a telephone call to one or more telephone numbers associated with a set of data such as advertising data; means operable to receive a set of data associated with a called number; and the data display system according to claim 4.

* * * * *